(12) United States Patent
Kai

(10) Patent No.: US 7,152,879 B2
(45) Date of Patent: Dec. 26, 2006

(54) AIR BAG SYSTEM

(75) Inventor: Takeshi Kai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 316 days.

(21) Appl. No.: 10/825,479

(22) Filed: Apr. 14, 2004

(65) Prior Publication Data

US 2004/0212187 A1 Oct. 28, 2004

(30) Foreign Application Priority Data

Apr. 22, 2003 (JP) ............................. 2003-116749

(51) Int. Cl.
*B60R 21/231* (2006.01)
(52) U.S. Cl. .................................. 280/743.2
(58) Field of Classification Search ............. 280/743.2, 280/743.1, 733, 731, 732
See application file for complete search history.

(56) References Cited

U.S. PATENT DOCUMENTS

| 3,784,225 A | 1/1974 | Fleck et al. |
| 3,929,350 A | 12/1975 | Pech |
| 4,887,842 A * | 12/1989 | Sato ........................ 280/730.1 |
| 5,427,410 A | 6/1995 | Shiota et al. |
| 5,871,230 A * | 2/1999 | Lewis ........................ 280/733 |
| 6,505,853 B1 * | 1/2003 | Brannon et al. ......... 280/730.2 |
| 6,883,831 B1 * | 4/2005 | Hawthorn et al. .......... 280/739 |
| 2004/0090055 A1 * | 5/2004 | Kassman et al. ........ 280/743.2 |
| 2004/0207189 A1 * | 10/2004 | Miyata .................... 280/743.2 |

FOREIGN PATENT DOCUMENTS

JP 5-178146 7/1993

* cited by examiner

*Primary Examiner*—David R. Dunn
(74) *Attorney, Agent, or Firm*—Hamre, Schumann, Mueller & Larson, P.C.

(57) ABSTRACT

By disposing external straps 36 to 38 which are passed through a tubular member 34 which passes through an air bag 21 in a tunnel-like fashion to open in side surfaces of the air bag 21 are disposed on an outer circumference of the air bag 21 and controlling the deployment shape of the air bag 21 by the external straps 36 to 38 so disposed, the occupant restraining performance of the air bag can effectively be enhanced.

3 Claims, 9 Drawing Sheets

US 7,152,879 B2

AIR BAG SYSTEM

BACKGROUND OF THE INVENTION

The present invention relates to an air bag system in which a folded air bag and an inflator are supported on a retainer, so that the air bag is inflated to be deployed into a passenger compartment of a vehicle by a gas produced by the inflator at the time of collision.

While an air bag which deploys into the passenger compartment of a vehicle to restrain an occupant at the time of collision of the vehicle is farmed by sewing a plurality of base fabrics, it is difficult to control the deployment shape of the air bag as desired only by devising the shapes of the base fabrics. To cope with this, conventionally, a strap for connecting the base fabrics together or a strap for connecting the base fabric to a retainer is provided in the interior of the air bag, whereby the deployment shape of the air bag is controlled by allowing the tension of the strap to be applied to the base fabrics at the time of deployment of the air bag (for example, refer to JP-A-5-178146).

However, since a job of installing the strap in the interior of the air bag is troublesome, the processing costs are increased, and since the tension of the strap is applied only to the connecting portion with the base fabric, it is difficult to control the deployment shape of the air bag as desired.

SUMMARY OF THE INVENTION

The invention is made to address these situations, and an object thereof is to enable a freer control of the deployment shape of the air bag with a simple construction.

With a view to attaining the object, according to a first aspect of the invention, there is proposed an air bag system in which a folded air bag and an inflator are supported on a retainer, so that the air bag is inflated to be deployed into a passenger compartment of a vehicle by a gas produced by the inflator at the time of collision, wherein a through hole is formed which passes through the air bag in a tunnel-like fashion to open in both side surfaces of the air bag, so that a deployment shape of the air bag is controlled by an external strap which passes through the through hole to be disposed on an outer circumference of the air bag.

According to the construction that is described above, since the external strap which is passed through the through hole which passes through the air bag in the tunnel-like fashion to open in the side surfaces of the air bag is disposed on the outer circumference of the air bag, the deployment shape of the air bag can be controlled by the external strap so as to enhance the occupant restraining performance of the air bag effectively. In particular, by disposing the external strap on the external portion of the air bag, not only can the number of man-hours for processing be reduced when compared with a case where the strap is disposed in the interior of the air bag but also the deployment shape of the air bag can be controlled more freely due to the external strap being brought into not a point contact but a line or surface contact with the air bag, and moreover, the behaviors of the air bag in the deployment process can be stabilized.

Note that a tubular member 34 in embodiments corresponds to the through hole in the invention and first to fourth external straps correspond to the external strap 36 to 39 in the invention.

DETAILED DESCRIPTION OF THE PREFERRED EMBODIMENTS

Modes for carrying out the invention will be described below based on embodiments of the invention illustrated in the accompanying drawings.

Figure 1:
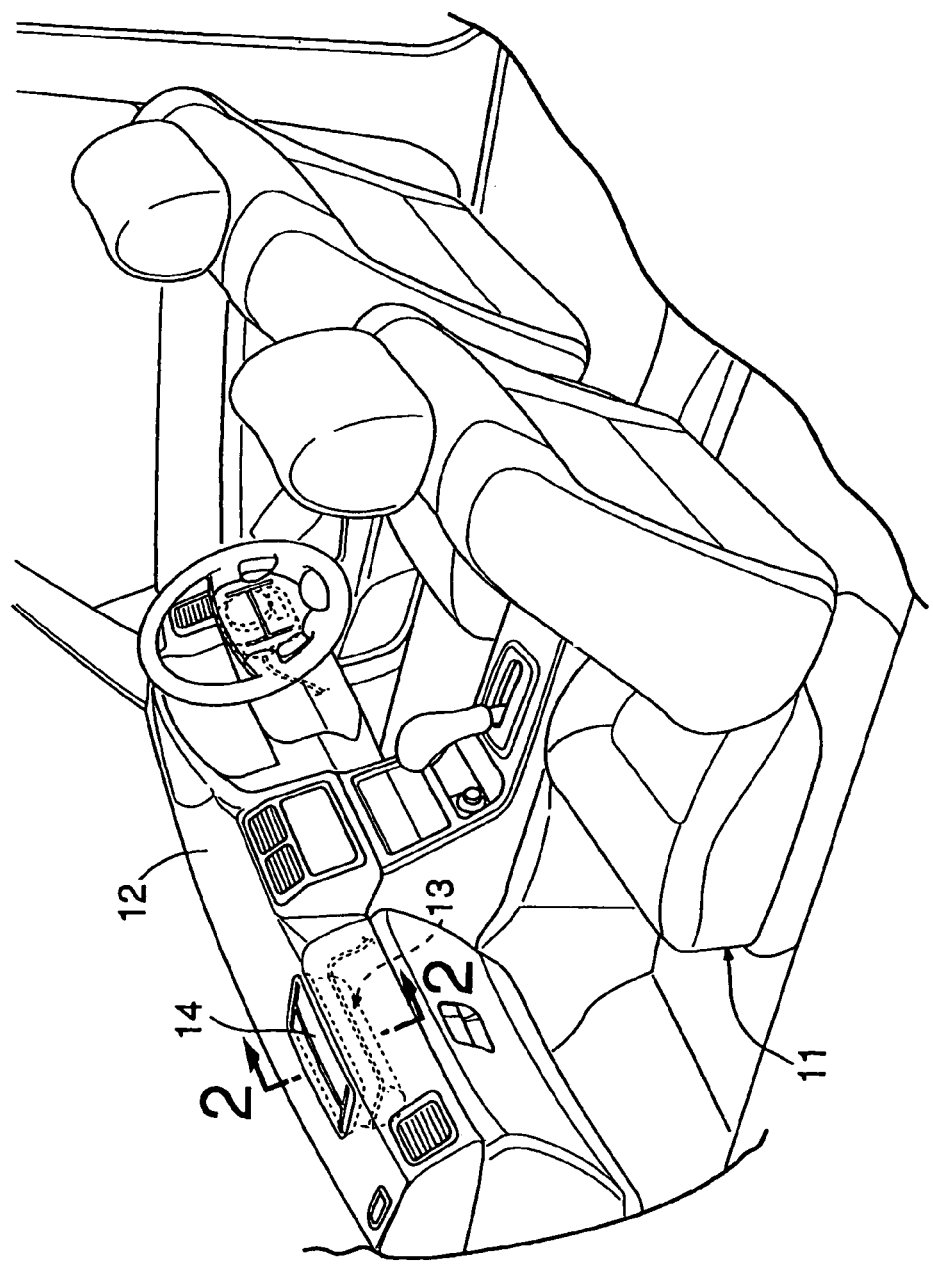
FIG. 1 is a perspective view of a front part of a passenger compartment of an automobile.
Figure 2:
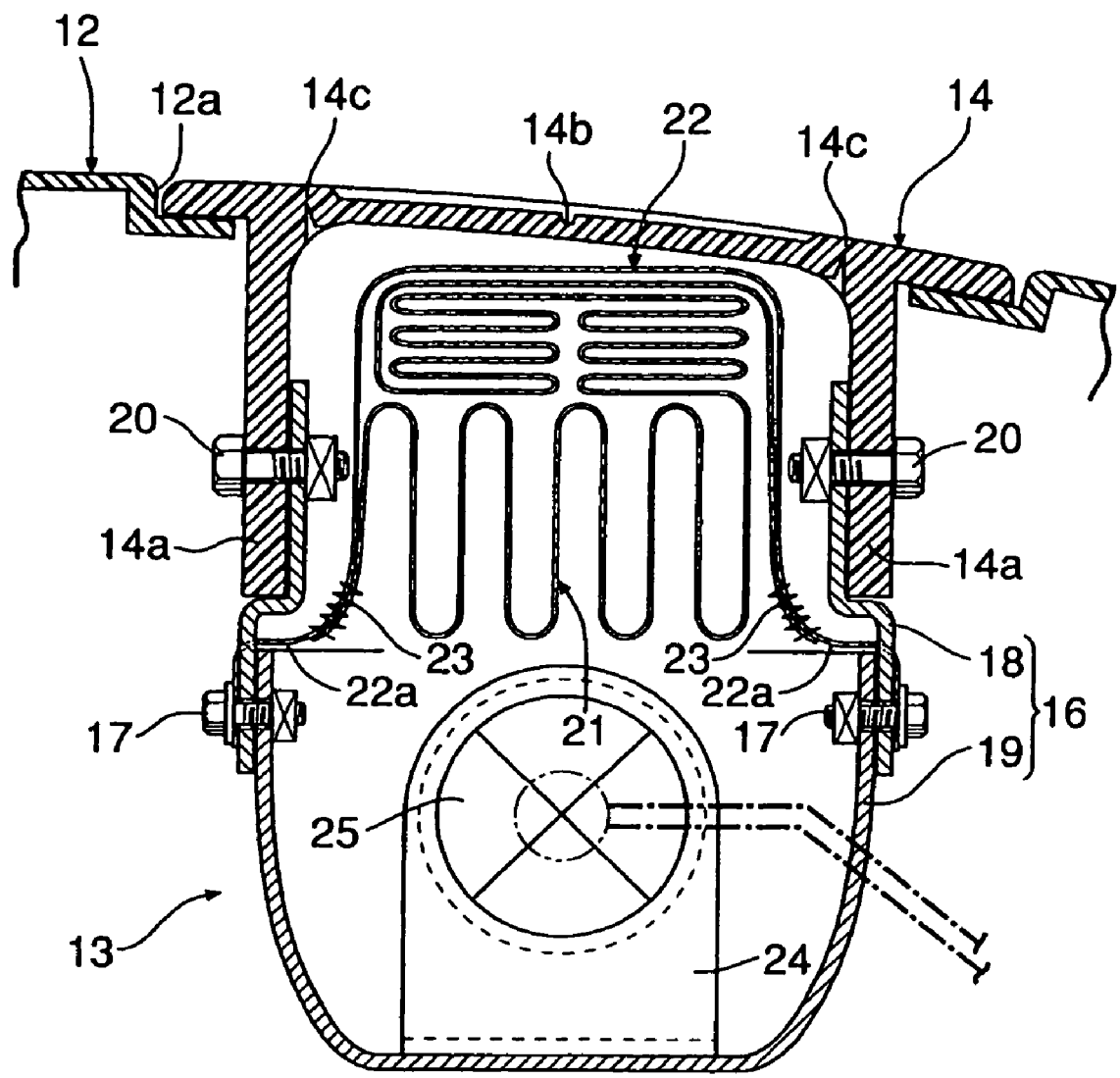
FIG. 2 is an enlarged cross-sectional view taken along the line 2—2 in FIG. 1.
Figure 3:
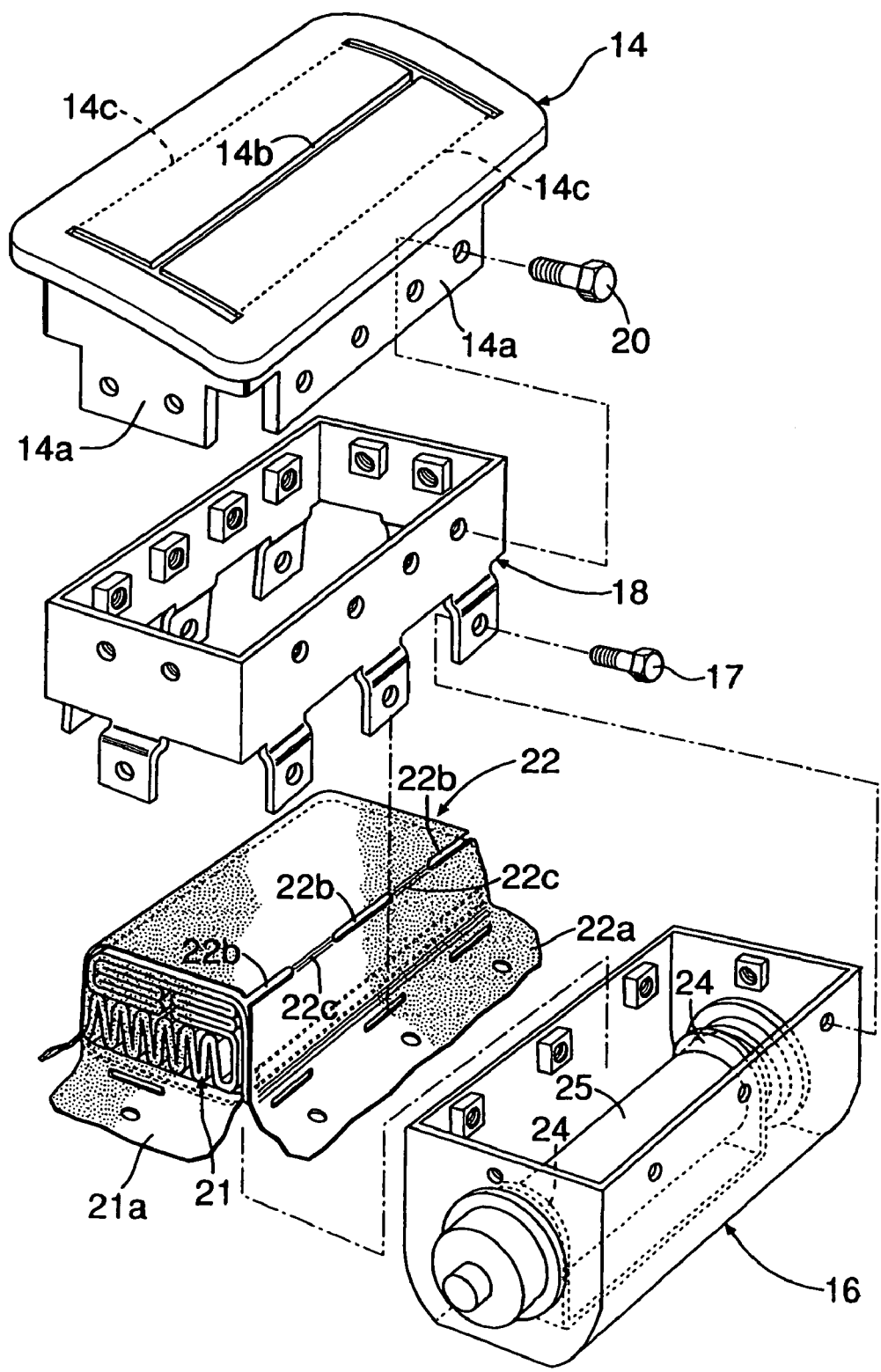
FIG. 3 is an exploded perspective view of an air bag system.
Figure 4:
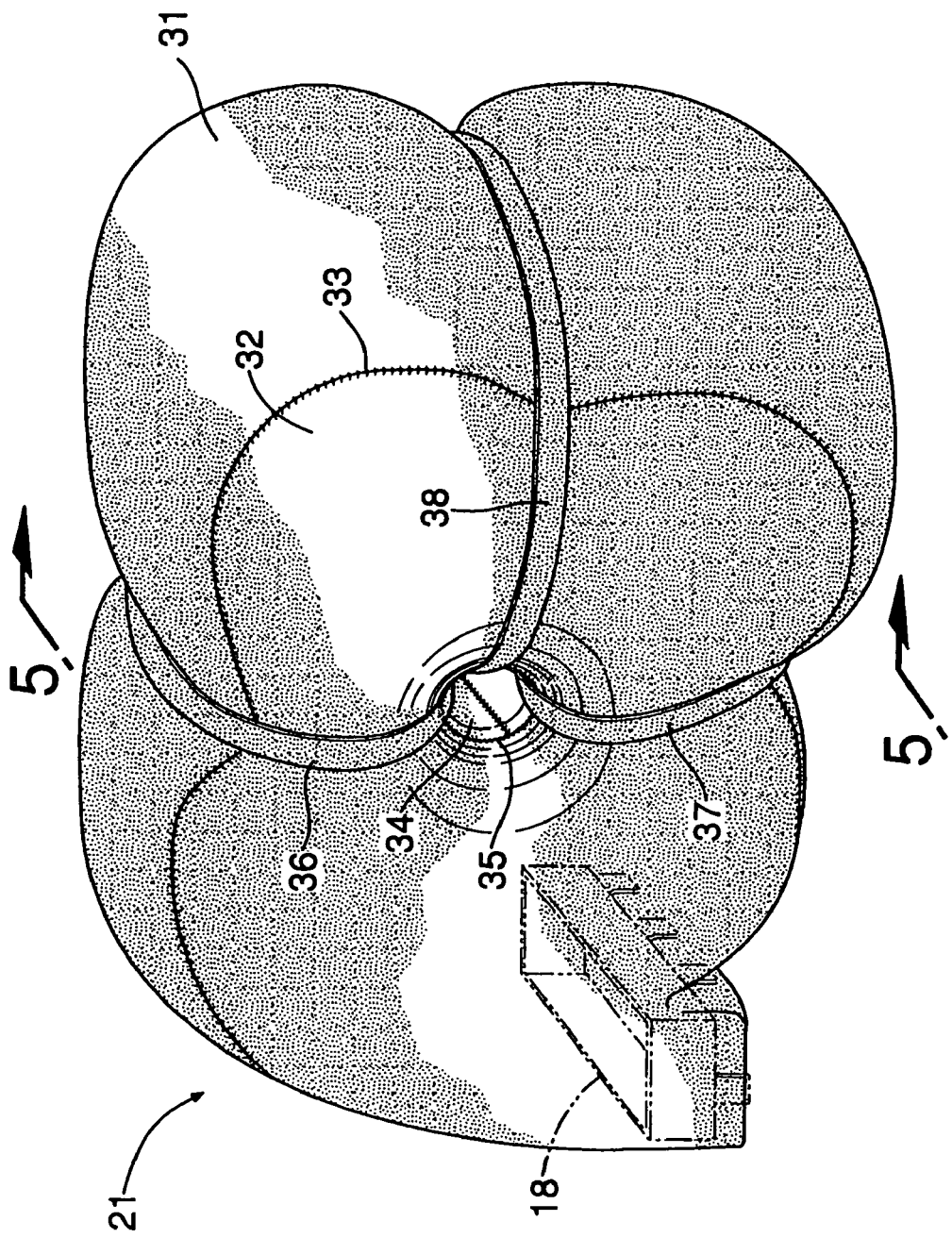
FIG. 4 is a perspective view of an air bag in a deployed state.
Figure 5:
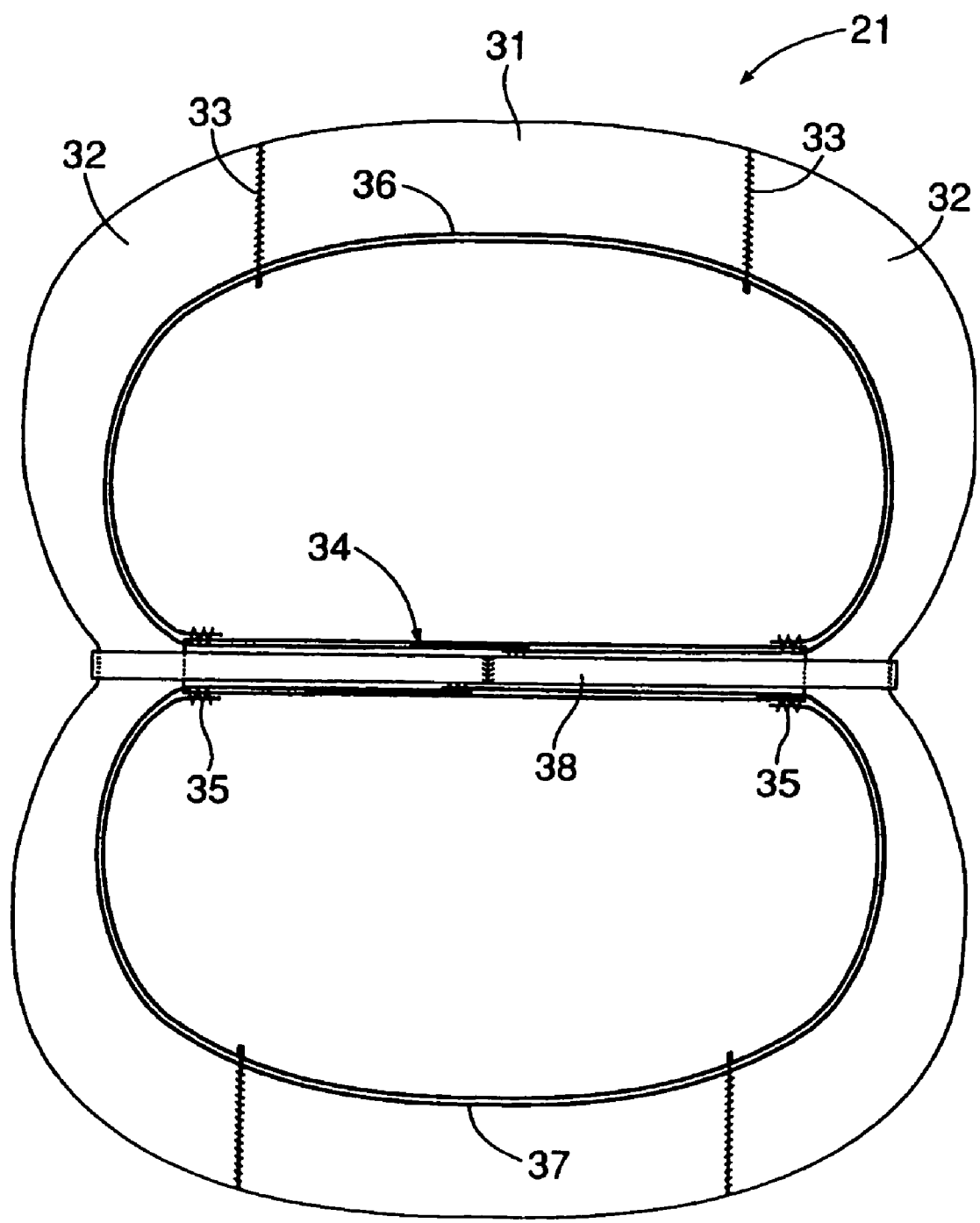
FIG. 5 is a cross-sectional view taken along the line 5—5 in FIG. 4.
Figure 6:
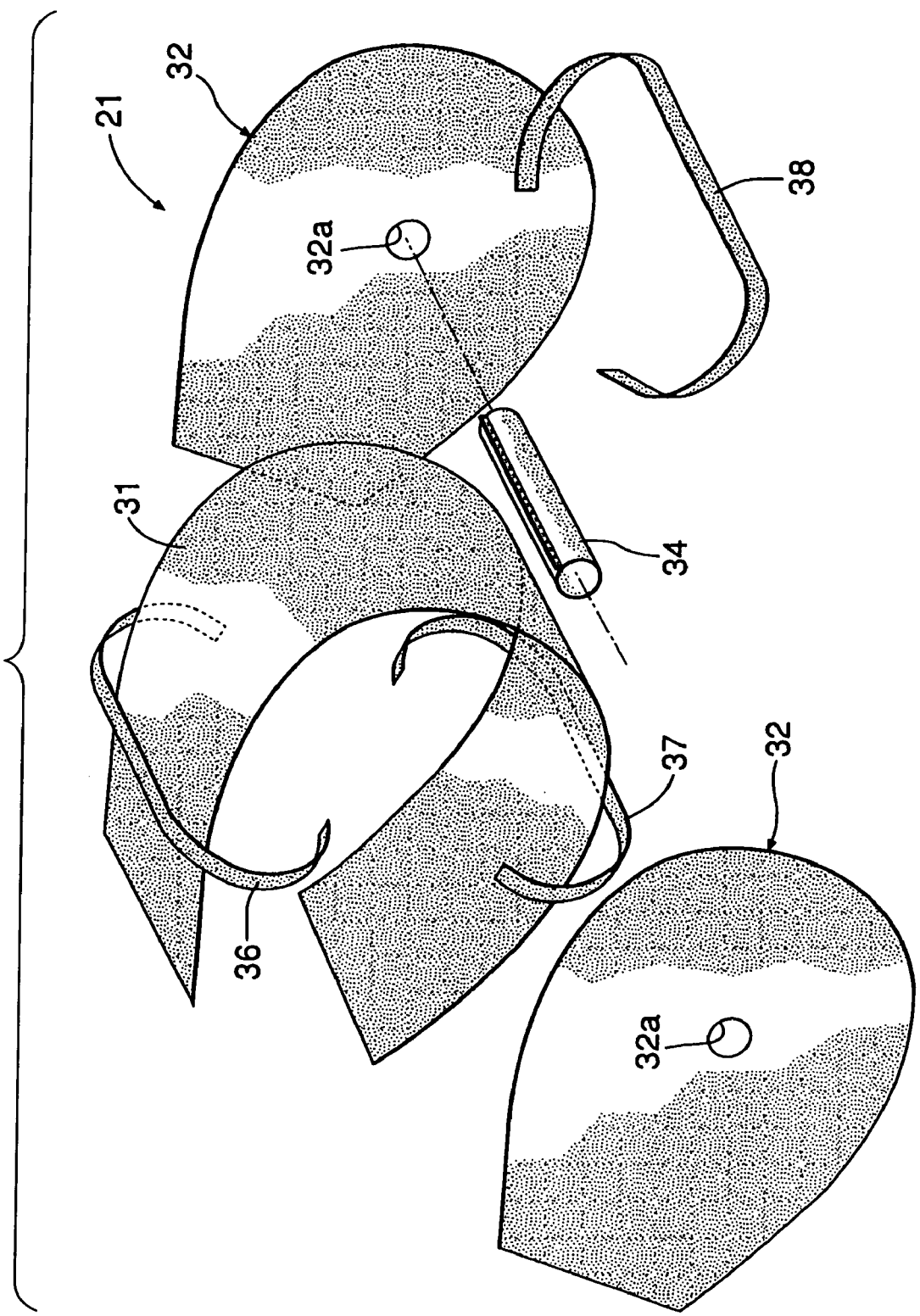
FIG. 6 is an exploded perspective view of the air bag.

FIGS. 1 to 6 illustrate a first embodiment of the invention, in which FIG. 1 is a perspective view of a front part of a passenger compartment of an automobile, FIG. 2 is an enlarged cross-sectional view taken along the line 2—2 in FIG. 1, FIG. 3 is an exploded perspective view of an air bag system, FIG. 4 is a perspective view of an air bag in a deployed state, FIG. 5 is a cross-sectional view taken along the line 5—5 in FIG. 4, and FIG. 6 is an exploded perspective view of the air bag.

As shown in FIG. 1, an air bag system 13 for a front passenger seat 11 is provided at an upper portion in a dashboard 12 disposed in front of the front passenger seat 11.

As shown in FIGS. 2 and 3, a retainer 16 forte air bag system 13 is fixed to support portions 14a which extend downwardly from a lid 14 fixed to the sides of an opening formed in a top surface of the dashboard 12. The retainer 16 includes an upper retainer 18 and a lower retainer 19 which are fixed together with a plurality of bolts 17, and the upper retainer 18 is fixed to the support portions 14a of the lid 14 with a plurality of bolts 20.

A folded air bag 21 is accommodated in a space surrounded by the upper retainer 18 and the lid 14 in a state in which top, front and rear sides of the air bag 21 are encompassed by a fabric packing flap 22. The packing flap 22 is sewn 23, 23 to the air bag 21 along front and rear edges thereof, and fixing portions 22a, 22a at a lower end of the packing flap 22 and fixing portions 21a, 21a at a lower end of the air bag 21 are held between the upper retainer 18 and the lower retainer 19 and are then fastened together to the upper and lower retainers with the bolts 17. Brittle portions 22c are formed at a rear portion on the top surface of the packing flap 22 via slits 22b.

A thin tearable line 14b adapted to be broken when the air bag 21 inflates is formed in an H-shape in the lid 14, and two thin hinge lines 14c, 14c adapted to be bent in association with the breakage of the tearable line 14b are also formed in the lid. A cylindrical inflator 25 is installed at a bottom portion of the lower retainer 19 via a pair of mounting brackets 24, 24.

As is clear from FIGS. 4 to 6, the air bag 21 is such as to be formed into a bag-like shape by sewing 33, 33 together a single main base fabric 31 and two side base fabrics 32, 32 which are disposed on left and right sides of the main base fabric 31, and top, rear (facing an occupant) and bottom surfaces of the air bag 21 in a deployed state are constituted by the main base fabric 31, whereas left and right surfaces of the air bag 21 in such a state are constituted by the side base fabrics 32, 32. A tubular member 34 formed by sewing a fabric into a tubular configuration is sewn 35, 35 at both ends thereof to peripheries of openings 32a, 32a which are formed in centers of the left and right side base fabrics 32, 32, respectively. Consequently, the left and right side surfaces of the air bag 21 are allowed to communicate in a tunnel-like fashion by the tubular member 34.

Three belt-like external straps 36, 37, 38 are passed through the interior of the tubular member 34, respectively, and ends of the respective straps are sewn together so that the respective straps are formed into an annular-shape. The first external strap 36 is disposed so as to surround the air bag 21 from the left and right surfaces to the top surface thereof, the second external strap 37 is disposed to surround the air bag 21 from the left and right surfaces to the bottom surface thereof, and the third strap 38 is disposed to surround the air bag 21 from the left and right surfaces to the rear surface thereof. As this occurs, it is desirable to fix the external straps 36, 37, 38 to the air bag 21 at a plurality of locations so that the external straps 36, 37, 38 are not deviated relative to their proper positions on the air bag 21.

Thus, when an acceleration which reaches or exceeds a predetermined value is detected at the time of collision of the vehicle, the inflator 25 is ignited, and the folded air bag 21 starts to be inflated by a gas produced by the inflator 25. When the packing flap 22 receives a pressure applied by the inflating air bag 21, the brittle portions 22c in the packing flap 22 break, and furthermore, when the lid 14 receives the pressure applied by the inflating air bag 21, the thin tearable lines 14b break and the lid 14 opens along the hinge lines 14c, 14c, whereby the air bag 21 is allowed to deploy into the passenger compartment from an opening so formed in the lid 14 so as to restrain the occupant.

While the air bag 21 in the folded state is easy to be disrupted in shape by an external force, the shape of the air bag 21 can be stabilized by being encompassed by the packing flap 22, whereby not only can the disruption in shape of the air bag 21 be prevented when the air bag 21 is carried as a single unit or is installed in the interior of the retainer 16 but also the handling property thereof can be enhanced.

Then, when the air bag 21 is allowed to deploy into the passenger compartment, since the three external straps 36, 37, 38 which are in abutment with the outer circumferential surface of the air bag 21 produce a tension to thereby restrict the inflation of the air bag 21, the deployment shape of the air bag 21 can be controlled as required by altering the dimensions and mounting positions of the external straps 36, 37, 38.

In particular, since the external straps 36, 37, 38 are disposed at the external portions of the air bag 21, when compared with internal straps which are disposed in the interior of the air bag 21, the number of man-hours required to mount the external straps can be decreased, and moreover, since the external straps 36, 37, 38 are brought into not a point contact but a line or surface contact with the air bag 21, the deployment shape of the air bag 21 can be controlled more freely. In addition, the behaviors of the air bag 21 in the deployment process can be stabilized so as to enable a smooth deployment by pressing the outer circumferential surface of the air bag 21 in the deployment process by the external straps 36, 37, 38.

Figure 7:
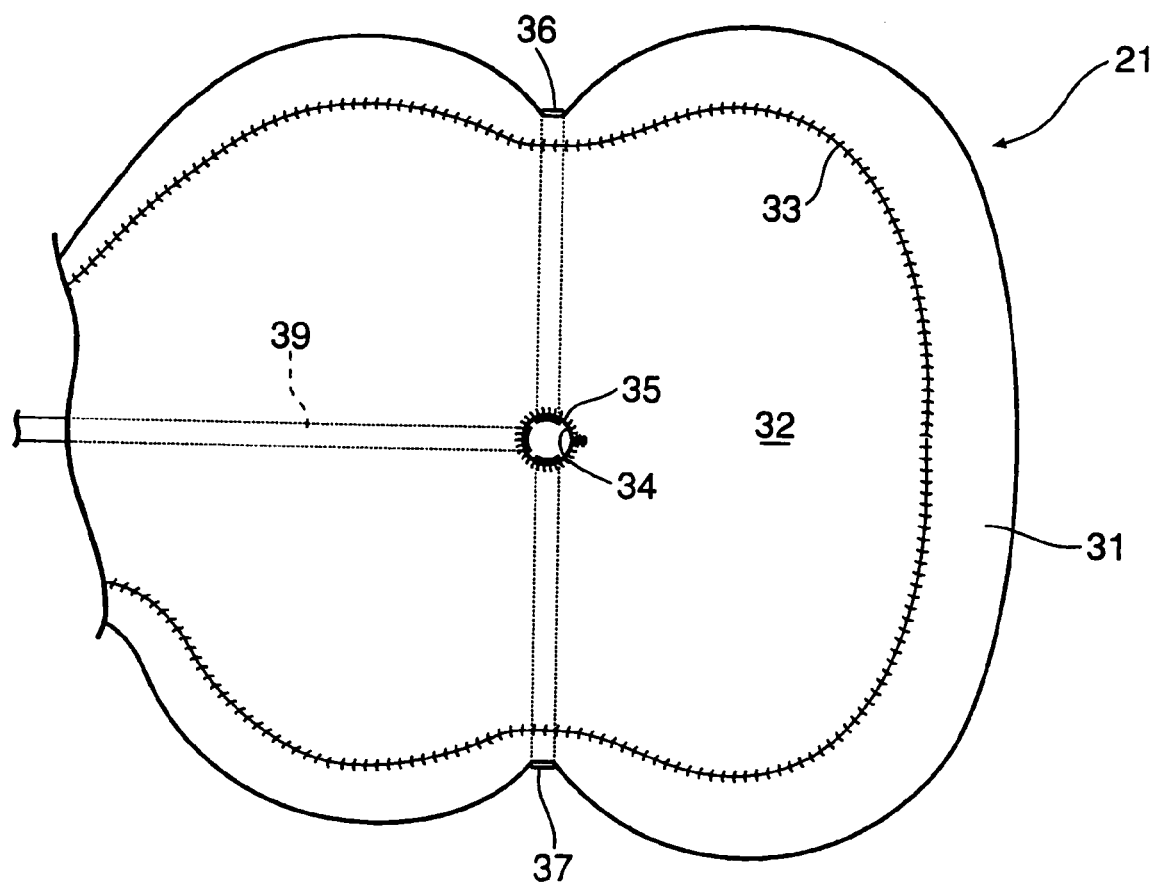
FIG. 7 is a vertical cross-sectional view of an air bag according to a second embodiment of the invention which is in a deployment state.

The external straps are arranged arbitrarily, and for example, as illustrated in a second embodiment shown in FIG. 7, the third external strap 38 of the first to third straps 36 to 38 in the first embodiment is removed, and instead, a fourth external strap 39 may be arranged in such a manner as to pass through the interior of the tubular member 34 so as to cover the air bag 21 from the left and right surfaces to the front surface thereof.

In addition, while the air bag 21 in the first and second embodiments is provided with the external straps 36 to 38 only, an internal strap or straps may be used in parallel with the external straps.

Figure 8:
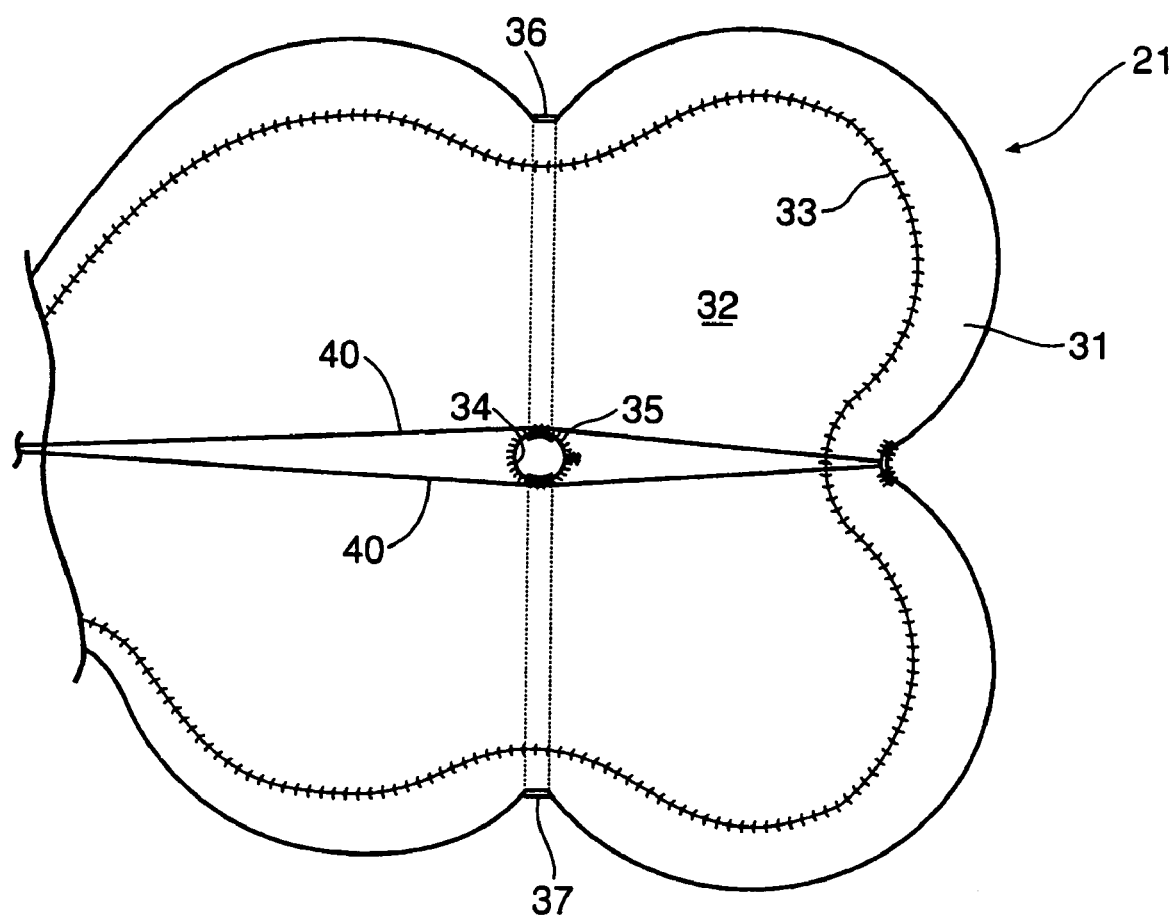
FIG. 8 is a vertical cross-sectional view of an air bag according to a third embodiment of the invention which is in a deployment state.
Figure 9:
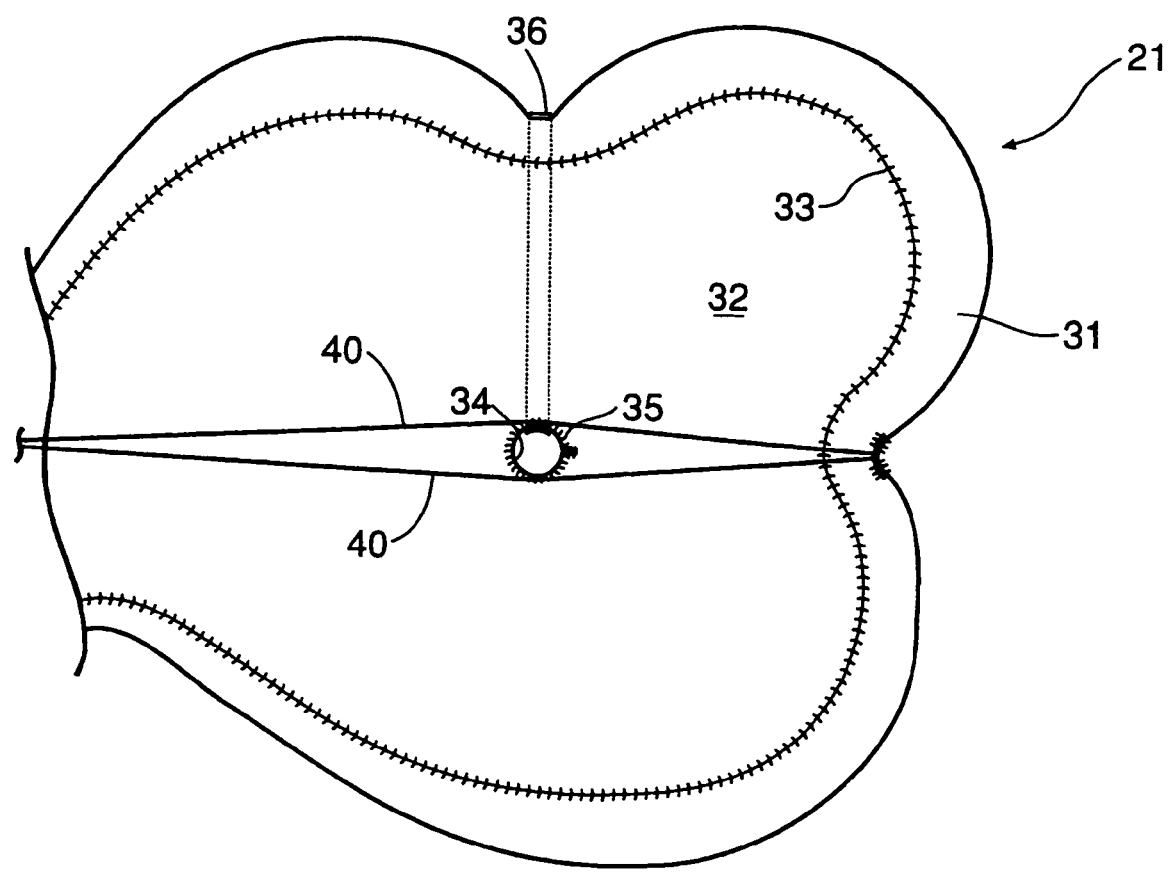
FIG. 9 is a vertical cross-sectional view of an air bag according to a fourth embodiment of the invention which is in a deployment state.

For example, in a third embodiment illustrated in FIG. 8, in addition to the external straps 36, 37 in the first and second embodiments, a rear end portion of the main base fabric 31 of the air bag 21 is connected to the retainer 16 by two internal straps 40, 40. The two internal straps 40, 40 are disposed above and below the tubular member 34 in such a manner as to bypass it so that no interference between the straps and the tubular member occurs. In addition, a fourth embodiment illustrated in FIG. 9 is such that the second external strap 37 in the third embodiment is removed.

Thus, even if the internal straps are used together with the external straps, when compared with an air bag employing only an internal strap or straps, not only can the control property of the deployment shape of the air bag 21 be enhanced but also the stability in behaviors of the air bag 21 at the time of deployment can be enhanced, which can contribute to the reduction in production costs.

Thus, while the embodiments of the invention are described in detail heretofore, the invention can be modified variously with respect to its design without departing from the spirit and scope of the invention.

For example, while the air bag system 13 for the front passenger seat is described in the embodiments, the invention can be applied to an air bag system for use for a driver's seat or at any locations within the passenger compartment of the vehicle.

As is described above, according to the first aspect of the invention, since the external straps which are passed through the through hole which passes through the air bag in the tunnel-like fashion to open in the side surfaces of the air bag are disposed on the outer circumference of the air bag, the deployment shape of the air bag can be controlled by the external strap so as to enhance the occupant restraining performance of the air bag effectively. In particular, by disposing the external straps on the external portion of the air bag, not only can the number of man-hours for processing be reduced when compared with a case where the straps are disposed in the interior of the air bag but also the deployment shape of the air bag can be controlled more freely due to the external straps being brought into not a point contact but a line or surface contact with the air bag, and moreover, the behaviors of the air bag in the deployment process can be stabilized.

What is claimed is:

1. An air bag system comprising:
   an inflator;
   a folded air bag which is inflatable to be deployed into a passenger compartment of a vehicle by a gas produced by the inflator during a collision and is provided with a through hole passing through the air bag to open in both side surfaces thereof;
   a retainer supporting the inflator and the folded air bag; and
   an external, annular strap which passes through the through hole in the air bag and controls a deployment shape of the air bag.

2. The air bag system according to claim 1, further including an internal strap.

3. The air bag system according to claim 1, wherein said external, annular strap is a plurality of external, annular straps, said straps surrounding different surfaces of the air bag at a time of deployment of the air bag.

* * * * *